(12) United States Patent
Lallouet et al.

(10) Patent No.: US 7,708,577 B2
(45) Date of Patent: May 4, 2010

(54) ELECTRICAL CONNECTION STRUCTURE FOR A SUPERCONDUCTOR ELEMENT

(76) Inventors: Nicolas Lallouet, 98 Les Fontinettes, La barriere du Bois, 62132 Fiennes (FR); James Maguire, 5 Dandelion Dr., Andover, MA (US) 01810

( * ) Notice: Subject to any disclaimer, the term of this patent is extended or adjusted under 35 U.S.C. 154(b) by 1028 days.

(21) Appl. No.: 11/373,816

(22) Filed: Mar. 9, 2006

(65) Prior Publication Data
US 2010/0071927 A1    Mar. 25, 2010

(51) Int. Cl.
*H01R 13/253* (2006.01)
(52) U.S. Cl. ............................................. 439/190
(58) Field of Classification Search ............. 439/181; 505/163, 885; 174/15.4, 15.5
See application file for complete search history.

(56) References Cited

U.S. PATENT DOCUMENTS

| | | | | |
|---|---|---|---|---|
| 4,485,266 A * | 11/1984 | Minati et al. | ............... | 174/15.4 |
| 5,991,647 A * | 11/1999 | Brockenborough et al. | . | 505/163 |
| 6,888,060 B2 * | 5/2005 | Ashibe et al. | ............... | 174/15.3 |
| 7,094,973 B2 * | 8/2006 | Ashibe et al. | ............ | 174/125.1 |
| 2004/0237542 A1 * | 12/2004 | Zurecki et al. | ............... | 62/50.7 |

FOREIGN PATENT DOCUMENTS

| | | |
|---|---|---|
| EP | 0780926 | 12/1996 |
| EP | 1283576 | 2/2002 |
| EP | 1489693 | 5/2004 |

OTHER PUBLICATIONS

French Search Report- Dec. 7, 2005.

* cited by examiner

*Primary Examiner*—Alexander Gilman
(74) *Attorney, Agent, or Firm*—Sofer & Haroun, LLP

(57) ABSTRACT

The invention relates to an electrical connection structure for a superconductor element cooled by a cryogenic fluid and connected to an electrical bushing, which bushing passes successively through an enclosure at an intermediate temperature between ambient temperature and the temperature of the cryogenic fluid, and an enclosure at ambient temperature, said bushing projecting outside the ambient temperature enclosure. According to the invention, said intermediate enclosure is filled at least in part with a solid material of low thermal conductivity, such as a polyurethane foam or a cellular glass foam. The invention is applicable to connecting a superconductor cable at cryogenic temperature to a device for equipment at ambient temperature.

10 Claims, 2 Drawing Sheets

ELECTRICAL CONNECTION STRUCTURE FOR A SUPERCONDUCTOR ELEMENT

GOVERNMENT LICENSE RIGHTS

This invention was made with government support under contract No. DE-FC36-00GO13032 awarded by the Department of Energy (DOE). The government has certain rights in the invention.

RELATED APPLICATION

This application is related to and claims the benefit of priority from French Patent Application No. 05 50694, filed on Mar. 17, 2005, the entirety of which is incorporated herein by reference.

FIELD OF THE INVENTION

The present invention relates to an electrical connection structure for a superconductor element, such as a cable transporting electricity under medium or high voltage. The structure enables the end of the superconductor element at cryogenic temperature to be connected to a piece of equipment or to a device at ambient temperature, usually in open air.

BACKGROUND OF THE INVENTION

Because of the large temperature difference between the superconductor element and the equipment to be connected to said element, i.e. between ambient temperature and cryogenic temperature which may be about −200° C., it is necessary to interpose a connection structure between the element and the equipment in order to make the temperature transition while minimizing heat losses, and while also complying with electrical constraints due for example to the high voltage of a cable. The structure then includes an electrical bushing constituted mainly by a central conductor surrounded by an insulating sheath for transporting the electricity from the superconductor cable to an outlet connection at ambient temperature. Over some reasonable length, the structure must make the temperature transition while ensuring that losses by thermal conduction are low so as to avoid boiling the cryogenic liquid cooling the cable and/or so as to avoid increasing the costs of cooling the cable.

The solution to the problem consists in providing the connection structure with an adiabatic intermediate enclosure, an airlock or "buffer" enclosure so to speak, placed between the portion at cryogenic temperature and the portion of the connection structure that is at ambient temperature. The electrical bushing passes through the intermediate enclosure. This solution is described, for example, in European patent application EP 1 283 576. The side walls of the intermediate enclosure are constituted by the side walls of a cryostat. The bottom and top walls have fastener flanges through which the electrical bushing passes, the bottom wall being adjacent to the portion at cryogenic temperature and the top wall being adjacent to the portion at ambient temperature. The intermediate enclosure is either evacuated or else filled with a gas. It is therefore essential to ensure that the places where the electrical bushing passes through the bottom and top walls are leaktight, thus leading to manufacturing constraints that are difficult and expensive. For example, even a very small amount of leakage between the portion at cryogenic temperature and the intermediate enclosure (e.g. a leak of about $10^{-8}$ millibars per liter second (mbar/L.s)) inevitably leads to a change in the composition of the gas or to degradation in the level of the vacuum in the intermediate enclosure. If the cryogenic fluid is liquid nitrogen, a leak leads to gaseous nitrogen being present in the intermediate enclosure, thus leading firstly to an additional consumption of liquid nitrogen, and secondly to a reduction in the thermal insulation of the intermediate enclosure. The excess pressure in the intermediate enclosure that results from such a leak is incapable of being controlled by means of safety valves since opening a valve would destroy the thermal insulating medium (vacuum or gas). In addition, it is not easy to perform on-site maintenance of such a connection structure away from the workshop. For example, reestablishing a vacuum in the intermediate enclosure or refilling it with gas on site requires special equipment and specially-trained staff.

OBJECT AND SUMMARY OF THE INVENTION

The present invention provides a solution to this technical problem without using a gas or a vacuum in the intermediate enclosure.

More precisely, the present invention relates to an electrical connection structure for a superconductor element cooled by a cryogenic fluid and connected to an electrical bushing, which bushing passes successively through an enclosure at an intermediate temperature between ambient temperature and the temperature of the cryogenic fluid, and an enclosure at ambient temperature, said bushing projecting outside the ambient temperature enclosure. According to the invention, said intermediate enclosure is filled at least in part with a solid material of low thermal conductivity.

Advantageously, said material is based on foam, such as a polyurethane foam or a cellular glass foam.

In a preferred embodiment, the intermediate enclosure forms a cryostat provided with a safety valve, and the enclosure at ambient temperature is filled, at least in part, with an electrically-insulating liquid. The outer walls of the ambient temperature enclosure are made of a material that is electrically insulating. Said liquid is advantageously oil.

In an embodiment, the electrical bushing comprises a central conductor surrounded by an electrically-insulating sheath which is terminated at one of its two ends by a bulb projecting into the cryogenic fluid.

BRIEF DESCRIPTION OF THE DRAWINGS

Other advantages and characteristics of the invention appear from the following description of an embodiment of the invention, given by way of non-limiting example and with reference to the accompanying drawings, in which.

MORE DETAILED DESCRIPTION

Figure 1:
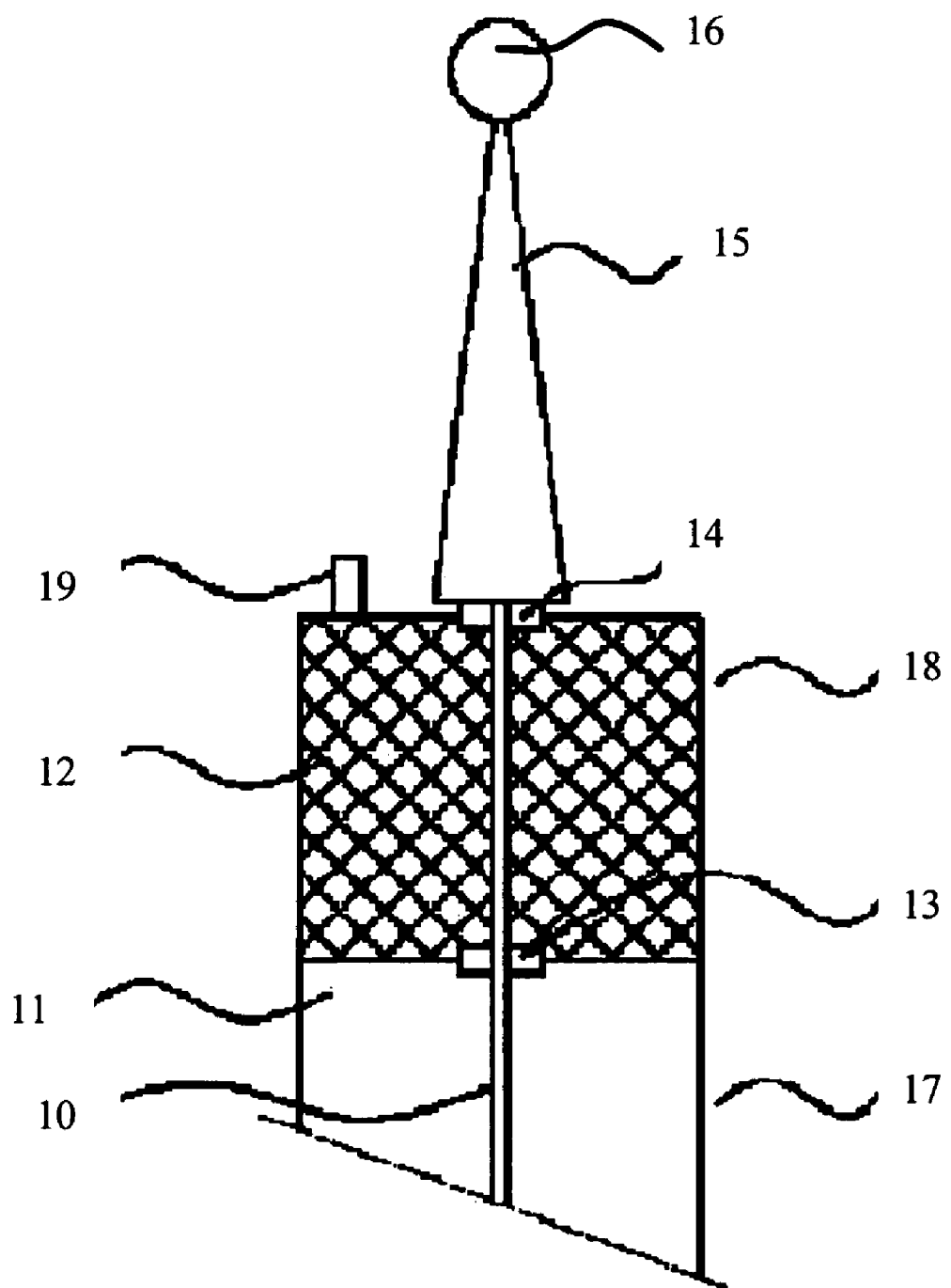
FIG. 1 is a diagram showing the principle of the invention.

In FIG. 1, the structure for connection to a superconductor cable (not shown) comprises an electrical bushing 10 connected to the superconductor element via its bottom end situated in an enclosure 11 at cryogenic temperature. An intermediate enclosure 12 adjacent to the cryogenic enclosure 11 is filled with a solid material presenting low thermal conductivity. This material is preferably in the form of a foam such as a polyurethane foam or a cellular glass foam, as commercially available under the trademark Foamglas, for example. The electrical bushing 10 passes through the bottom wall of the intermediate enclosure 11 via a leaktight fastening flange 13 and through the top wall via a leaktight fastening flange 14.

The electrical bushing 10 is extended on leaving the intermediate enclosure 12 into an enclosure 15 at ambient temperature which is terminated by electrical connection means 16 for connecting the bushing, and thus the superconductor element, to a suitable device or equipment. The intermediate enclosure is thus at a temperature between ambient temperature and the temperature of the cryogenic fluid. The walls 17 and 18 respectively of the enclosure 11 at cryogenic temperature and of the intermediate enclosure 12, form cryostat walls in order to achieve good thermal insulation. Since the intermediate enclosure is leaktight, it is preferably fitted with a safety valve 19 so as to handle any excess pressure that might arise in the event of a leak past the flanges 13 and 14.

It should be observed that the invention makes it possible to overcome the problem of a small leak past either flange 13 or 14. The effectiveness of the thermal insulation is maintained at a level that is relatively constant, even in the event of a small leak past either flange 13 or 14, since the leak has no effect on the insulating properties of the solid material filling the intermediate enclosure.

Figure 2:
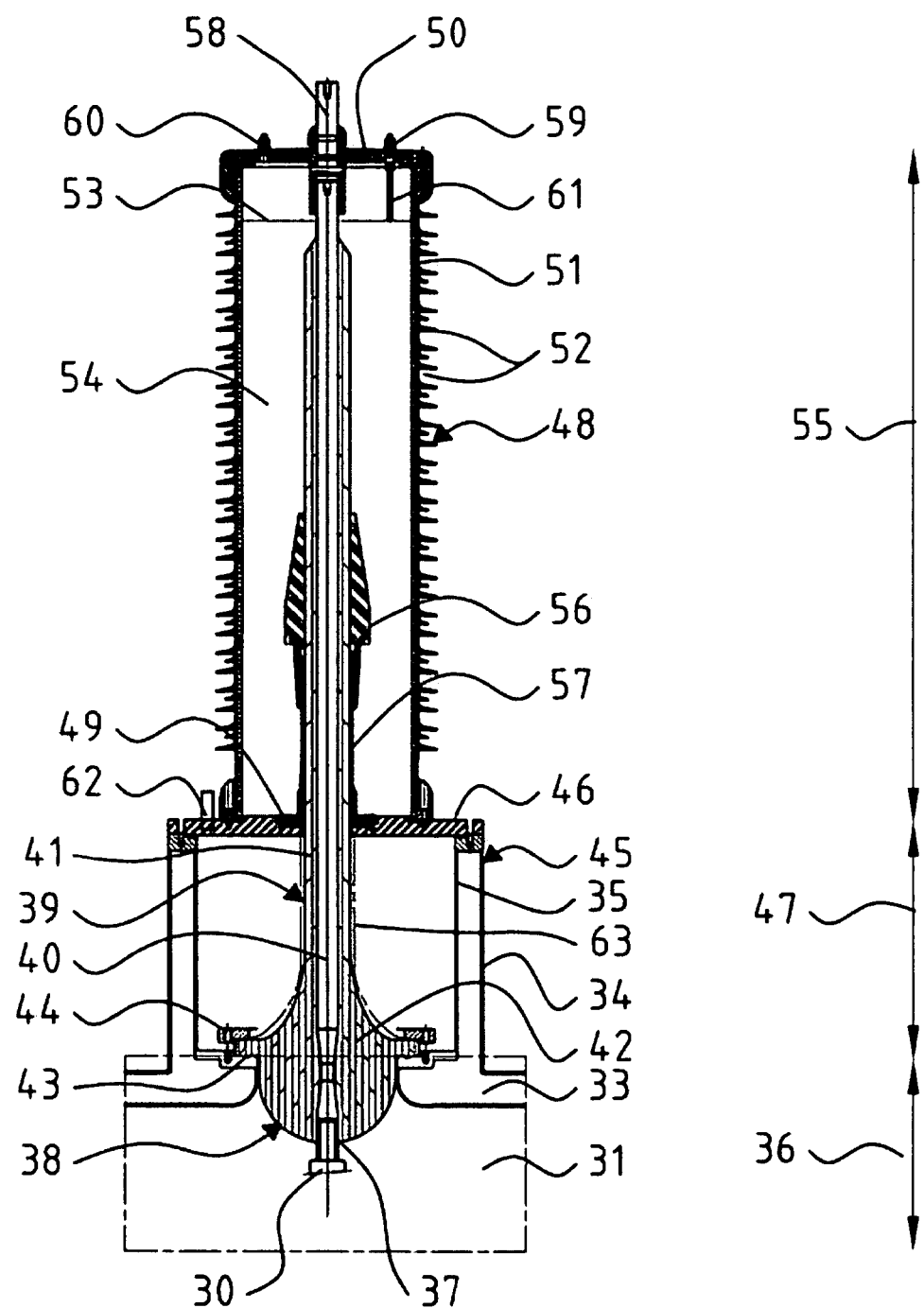
FIG. 2 is a longitudinal section through an embodiment of the invention.

FIG. 2 is a longitudinal section view through an embodiment of the invention, showing a superconductor cable 30 that is cooled by a cryogenic fluid 31, e.g. liquid nitrogen, contained in a cryostat 33 having an outer wall 34 and an inner wall 35. The vacuum between these two walls may be about $10^{-5}$ millibars (mbar), for example. The zone given reference 36 is at cryogenic temperature, which is about −200° C. for so-called "high temperature" superconductors.

The end of the superconductor cable is connected by an electrical connection 37 to the bottom end 38 of an electrical bushing 39. The bushing is mainly constituted by a central conductor 40 of an alloy of aluminum or of copper, having an electrically insulating sheath 41 molded thereabout, e.g. made of epoxy. The sheath is terminated at its bottom end by a bulb 42 including a fastening collar 43. A flange 44 secures the bulb 42 in leaktight manner to the inner wall 35 of the cryostat 33. The outside surface of the insulating sheath is covered in a layer 63 of electrically conductive material, e.g. by metallization. Since this material is connected to ground electrical potential and since the superconductor cable is at high voltage, the bottom end 38 of the insulating sheath is advantageously bulb-shaped so as to lengthen the creepage distance between ground and high voltage, thereby avoiding any electrical breakdown at the end 38.

The inner and outer walls 35 and 34 of the cryostat are extended vertically to form the side walls of an intermediate enclosure 45. This enclosure is thus very well insulated thermally. The bottom of this intermediate enclosure is closed in leaktight manner by the bulb 42 and the top of the enclosure is closed by a plate 46 that may be made of a metal alloy (e.g. a stainless steel or an aluminum alloy). The intermediate enclosure is filled with a solid material having low thermal conductivity. This material is preferably in the form of a foam such as a polyurethane foam or a cellular glass foam, e.g. the cellular glass foam sold under the trademark Foamglas. It is preferable to fill the intermediate enclosure completely with this solid material, but it is also possible to fill it in part only. In order to fill the intermediate enclosure, one or more blocks of solid foam may be machined, e.g. two blocks in the form of half-shells, or a single block that is machined with a central hole that is complementary in shape to the portion of the electrical bushing 39 that is situated in the intermediate enclosure 45, with said block(s) subsequently being placed in the intermediate enclosure. The temperature of the zone 47 lies between ambient temperature and cryogenic temperature.

Above the intermediate enclosure 45, an enclosure 48 at ambient temperature is secured to the plate 46. The plate presents good thermal conductivity so as to establish good heat exchange between the ambient temperature of air and the bottom of the enclosure at ambient temperature 48. The electrical bushing 39 passes through this top wall 46 in leaktight manner by means of a fastening and sealing flange 49, and it penetrates to the outside of the enclosure 48 via the top wall 50 of said enclosure at ambient temperature. Its side wall is constituted by an electrical insulator 51, e.g. glass fiber reinforced epoxy, commonly referred to as fiber reinforced polymer (FRP). The outside surface of this wall comprises a succession of fins 52 of insulating material, e.g. of silicone, for lengthening the path length of any leakage current on the surface, due to impurities deposited on said surface by surrounding pollution and rain. The ambient temperature enclosure 48 is filled up to a level 53 in a liquid 54 that is a good electrical insulator, such as silicone oil. In addition to providing good electrical insulation of the electrical bushing 39, the liquid 54 make it easier to stabilize the temperature of the enclosure at ambient temperature. The zone 55 is thus at a temperature that is close to ambient temperature.

A stress cone 56 situated inside the ambient temperature enclosure 48 surrounds the electrical bushing 39 at the break in the metallized layer 63 and is electrically connected thereto and also to the leaktight fastening flange 49, e.g. by means of taping 57 made up of semiconductive tapes. The function of this stress cone is to spread out or flare the electric field lines at the end of the metallization in order to avoid any discontinuity that could lead to electrical breakdown. The electrical bushing 39 is terminated outside the ambient temperature enclosure 48 by a connection tab 58 for feeding the superconductor cable with electricity under medium or high voltage, or for feeding ambient temperature equipment with electricity under medium or high voltage coming from the superconductor cable 30.

The plate 46 is preferably provided with a safety valve 62 in order to vent any excess pressure from the intermediate enclosure 45 as might be due to a leak of cooling liquid past the collar 43 and the fastening flange 44, with the cooling liquid then changing into gaseous form inside the intermediate enclosure.

The ambient temperature enclosure also has two connection valves 59 and 60 enabling it to be filled with oil, the valve 58 being connected to an extender 61 of polyethylene serving to monitor the depth of oil in the enclosure.

The above-described electrical connection structure that includes an intermediate enclosure filled at least in part with a solid material that is a good thermal insulator provides a good temperature transition between the portion at cryogenic temperature and the portion at ambient temperature, with heat flow in the cryogenic liquid being limited and compatible with the operating conditions of the installation and with easy maintenance both on site and in the workshop. The height of the structure, and in particular the height of the intermediate enclosure, can easily be adapted to the temperature difference conditions between the cryogenic portion and the ambient portion, and to electrical conditions such as the voltage and current values.

The embodiment describes relates to connecting a superconductor cable. Nevertheless, it is clear for the person skilled in the art that the invention applies to connecting any superconductor element at cryogenic temperature that needs to be connected to a device or apparatus or equipment at ambient temperature.

What is claimed is:

1. An electrical connection structure for a superconductor element cooled by a cryogenic fluid contained in a cryostat and connected to an electrical bushing near a wall of said cryostat, said bushing comprising:

a central conductor surrounded by an electrically-insulating sheath and is contained in a closed intermediate enclosure at an intermediate temperature between ambient temperature and the temperature of the cryogenic fluid and another enclosure at ambient temperature disposed on said intermediate enclosure, said bushing projecting outside the ambient temperature enclosure, wherein said intermediate enclosure is filled at least in part with a solid material of low thermal conductivity.

2. A connection structure according to claim 1, wherein said material is foam-based.

3. A connection structure according to claim 1, wherein said material is a cellular glass foam or a polyurethane foam.

4. A connection structure according to claim 1, wherein the side walls of said intermediate enclosure are formed by the walls of a cryostat.

5. A connection structure according to claim 1, wherein said intermediate enclosure is provided with a safety valve.

6. A connection structure according to claim 1, wherein said ambient temperature enclosure is filled, at least in part, with an electrically insulating liquid, and wherein the outside walls of said enclosure are made of an electrically insulating material.

7. A connection structure according to claim 6, wherein said liquid is oil.

8. A connection structure according to claim 1, wherein said electrical bushing comprises a central conductor surrounded by an electrically-insulating sheath, which is terminated at one of its two ends in the form of a bulb projecting into said cryogenic fluid.

9. A connection structure according to claim 8, wherein said bulb includes a sealed fastening flange for securing said bulb to said intermediate enclosure.

10. A connection structure according to claim 1, wherein said superconductor element is a cable.

* * * * *